United States Patent

Hsueh

[15] 3,681,693

[45] Aug. 1, 1972

[54] MEASUREMENT OF MAXIMUM DYNAMIC SKEW IN PARALLEL CHANNELS

[72] Inventor: Chia Ying Hsueh, Westboro, Mass.

[73] Assignee: RCA Corporation

[22] Filed: Nov. 27, 1970

[21] Appl. No.: 92,969

[52] U.S. Cl.................................324/188, 324/83 D

[51] Int. Cl.......G01r 25/00, G04f 9/00, H03d 13/00

[58] Field of Search....324/181, 185, 188, 186, 78 D, 324/83 A, 83 D

[56] References Cited

UNITED STATES PATENTS

| | | | |
|---|---|---|---|
| 2,951,985 | 9/1960 | Hudson et al. | 324/185 |
| 3,414,816 | 12/1968 | Tobey et al. | 324/83 A |

*Primary Examiner*—Alfred E. Smith
*Attorney*—H. Christoffersen

[57] ABSTRACT

Circuit for determining the times the first and last signals representing bits of character are read from a tape or other recording medium. Signals representing the bits are applied to the inputs of both an OR gate and a parity checker. The parity checker produces an output signal whenever the signals at its input comprise, for example, an odd number. Because of skew, the parity checker may produce several pulses of short duration before it stabilizes. The parity checker is coupled to a circuit that produces an output signal only in response to an input signal having greater than a given duration. The skew is measured by comparing the output signal of the circuit with the output signal of the OR gate delayed for a time period equal to the given duration.

5 Claims, 3 Drawing Figures

Inventor:
CHIA Y. HSUEH
BY H. Christoffersen
Attorney

Inventor:
CHIA Y. HSUEH

BY W. Christoffersen
Attorney

MEASUREMENT OF MAXIMUM DYNAMIC SKEW IN PARALLEL CHANNELS

BACKGROUND OF THE INVENTION

Devices for storing large quantities of binary information such as magnetic tapes, discs, drums, and the like, store the information in parallel channels. The unit of information is the binary digit, usually called a bit. Several bits can be combined into a larger unit, which is called a byte of a character.

The information can be read from a storage medium serially, bit by bit, until the required number of bits for a character have been accumulated. It is, however, faster to read all the bits comprising a character in parallel. Reading a character at a time is accomplished by having a read transducer and amplifier for each channel corresponding to a bit in a character. Limitations in manufacturing tolerances and other practical considerations preclude reading all the information bits comprising a character at exactly the same time. The time interval between reading successive bits in a character is called dynamic skew. Maximum dynamic skew is the time interval between reading the first and last bits of a character.

The integrity of the information read is often maintained by use of an extra bit called a parity bit. Parity may be even or odd. In even parity systems, the value of the parity bit (1 or 0) is selected for each character so that every character consists of an even number of 1's. Likewise, in odd parity systems, the value of the parity bit is selected so that every character consists of an odd number of 1's. Exclusive-ORing the bits in a character as read can then be used to indicate an error caused by picking up or dropping a 1 during the read operation.

One of several factors affecting maximum dynamic skew is the alignment of each channel's transducer. Transducers are usually mounted in a device or construction called a head with the transducers in fixed alignment with relation to one another. The deviation of the transducers from the fixed relation gives rise to skew when information is recorded on a medium by one device and read by another.

The reading devices have mechanical parts that are subject to misalignment and the amount of misalignment affects the maximum dynamic skew. One of the most important adjustments is azimuth, the alignment of the transducers with respect to the direction of travel of the channels. Usually the transducers are positioned exactly perpendicular to the path in which the channels move. Incorrect azimuth causes skew when reading by one device information written by another. Azimuth skew also arises when reading information written by the same device after the head alignment has been changed.

Information such as on a program library tape is written by one device and read by several others. Proper compatibility among devices is therefore necessary, and this requires limiting the maximum dynamic skew permissible for each device. To maintain a device within the limits of maximum permissible skew, it is necessary to be able to measure the maximum skew.

One way of measuring the skew of, for example, a tape drive, is to read a specially prepared standard tape having predetermined characters, such as all bits equal to a value of 1. The time interval between the presence of the first bit signal and the presence of all bit signals would be the maximum dynamic skew of the tape drive.

A more desirable system of measuring skew is one that uses variable characters. Such a system could be built into the tape drive and used to monitor skew continuously.

The system herein described can be used to measure maximum dynamic skew in variable binary information, and it can be permanently incorporated in a reading device to provide continuous monitoring of skew.

BRIEF DESCRIPTION OF THE INVENTION

In a circuit for measuring skew between the first and last arriving signals of a group of signals intended to be in time coincidence, all the signals of the group are applied to a first circuit that produces an output signal in response to the first signal to arrive. All the signals are also applied to a second circuit that produces an output signal only in response to the last signal to arrive. The difference in times of occurrence of the two output signals is a measure of the maximum dynamic skew.

DETAILED DESCRIPTION

Figure 1:
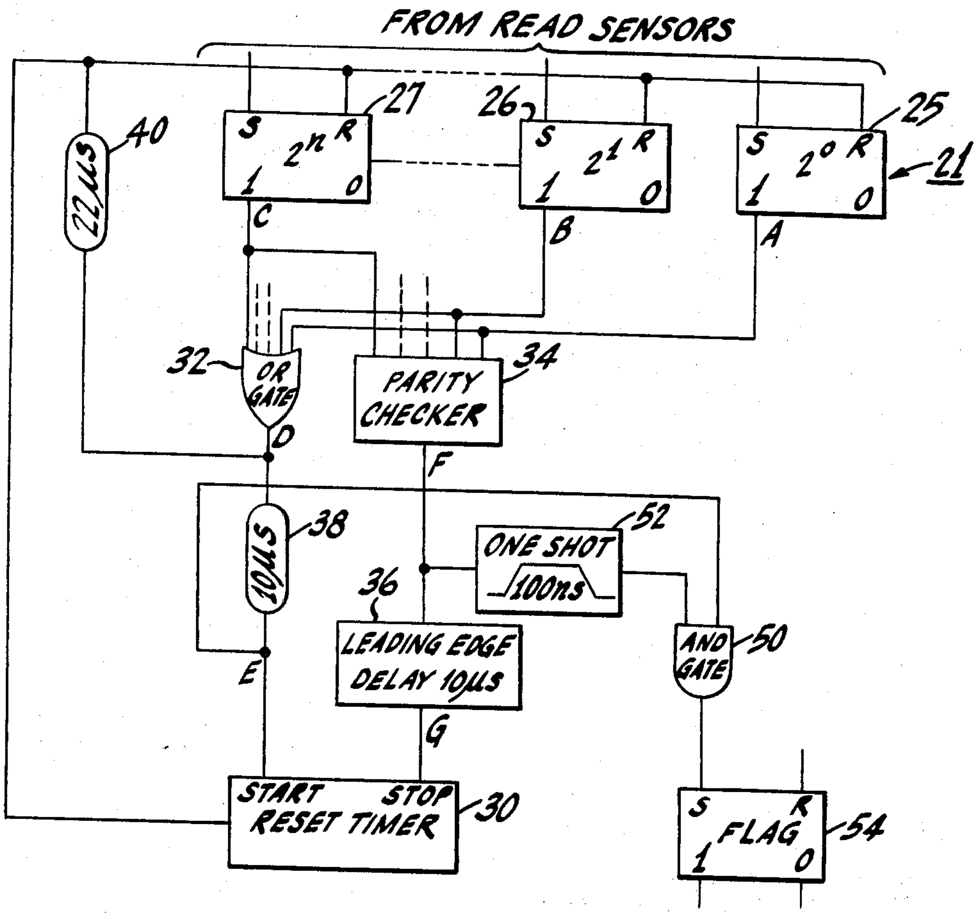
FIG. 1 is a logic block diagram of the preferred embodiment of the invention.

In a reading device such as a tape station, a character register is usually provided which consists of a number of flip-flops, one for each bit in a character. In FIG. 1, the character register 21 comprises $n + 1$ flip-flops of which three are shown. The flip-flops of the character register 21 are set by means of sensors not shown in the drawing. Each sensor includes a transducer for detecting the presence of a bit value of 1 in its associated channel. The output signal of each transducer is coupled to an amplifier. The output of the amplifier produces, in response to this signal, a pulse which sets a corresponding flip-flop in the character register 21. The set pulses need be no longer in duration than is necessary to set the corresponding flip-flop.

Because of dynamic skew, the various flip-flops set for each character in the character register 21 are not set at the same time. For example, the flip-flop 25, corresponding to the $2^0$ bit, may be set first. Next, the flip-flop 26, corresponding to the $2^1$ bit, is set and so on until the flip-flop 27 corresponding to the $2^n$ bit is set last. The time interval between setting the first and last flip-flops during the reading of each character, e.g., in the sequence above, between the setting of the flip-flop 25 and the setting of the flip-flop 27, in the maximum dynamic skew.

When the characters each consist of all 1's, a timer can be started when the first 1 is read by detecting its presence by means of an OR gate. The timer can be stopped when all the 1's are read by detecting the presence of all the bits by an AND gate. When reading variable binary information, however, the problem is to determine when the last 1 has been read since there may be several 0's in the character.

In a system in which the invention according to FIG. 1 is used, $n$ bits represent data and the extra bit represents a parity bit. For example, in FIG. 1 the $2^n$ register stage receives a signal indicative of a parity bit in an odd parity system. That is, the number of flip-flops set in the character register 21 for each character which is read will, if the character is correct, always be an odd number.

A timer 30 is used to measure time intervals between the first and last bit read in the character. The first character is detected by means of an OR gate 32. The 1 output terminal of each flip-flop in the character register 21 is connected to a different input terminal of the OR gate 32.

The last bit of a character is detected by the parity checker 34 which also is connected to the output terminal of all of the flip-flops in the character register 21.

In this example, the parity checker 34 will provide an output signal when signals appear on an odd number of its input terminals. Therefore, when the first bit of the character in the example is read, the 1 output of the flip-flop 25 will cause the parity checker 34 to produce an output level indicating odd parity in the character register 21. When the flip-flop 26 is set, there will be an even number of stages in the character register 21 set and the output signal of the parity checker 34 will be inactivated, i.e., 0. Subsequently, as each register stage in the character register 21 is set, the output signal of the parity checker 34 will fluctuate depending on whether the number of stages set is odd or even. The operation of parity checkers is well known in the art; it can consist, for example, of a cascaded set of Exclusive-OR gates.

To prevent the aforementioned fluctuations at the output terminal of the parity checker 34 from providing an erroneous output signal to the stop input terminal of the timer 30, a leading edge delay means 36 is coupled between the output terminal of the parity checker 34 and the stop input terminal of the timer 30. A leading edge delay means produces an output signal only after a signal has been presented at its input terminal for a period of time equal to a given delay interval. The output signal is discontinued upon the removal of the input signal. An input signal which is shorter in duration than the given delay interval will not cause an output signal to be produced. Leading edge delay circuits are well known in the art and examples are shown in U.S. Pat. Nos. 2,836,715 by Spielberg, 3,073,971 by E.J.Daigle, Jr., and 3,073,972 by R. H. Jenkins, all assigned to the same assignee as the present disclosure. The circuit shown in FIG. 3 is illustrative of a leading edge delay circuit and is explained briefly below.

Figure 3:
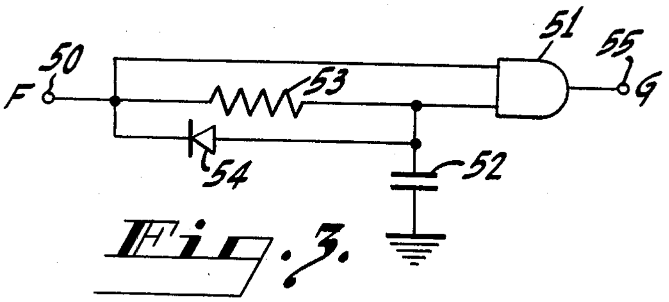
FIG. 3 is a schematic diagram of an example of a leading edge delay circuit.

The input terminal 50 in FIG. 3 is coupled directly to one input terminal of a two input AND gate 51. The other input terminal of the AND gate 51 is coupled to a capacitor 52 and to the input terminal 50 through a resistor 53. The resistor 53 is paralleled by a diode 54. The AND gate 51 produces an output signal of 1 represented, for example, by a high voltage level, only when signals representing 1's are applied to both input terminals. Initially, the input signal applied to the input terminal 50 is a low voltage level, such as ground, representing zero. The capacitor 52 is not charged and the output signal of the AND gate 51 is zero. When the signal at the input terminal 50 is raised to the voltage level representing 1, the input terminal of the AND gate 51 that is coupled directly to the input terminal 50 is primed. The capacitor 52, however, holds the other input terminal of the AND gate 51 at the zero level initially. The high level at the input terminal 50 charges the capacitor 52 through the resistor 53 at a rate determined by the RC time constant. When the charge on the capacitor 52 accumulates to the point where the voltage developed across it is sufficient to enable the AND gate 51, an output signal having the value of 1 is produced at the output terminal 55. The delay interval between the application of a 1 signal at the input terminal 50 and the appearance of a 1 signal at the output terminal 55 is a function of the RC time constant of the capacitor 52 and the resistor 53.

When the input signal 1 is removed and the voltage at the input terminal 50 is returned to the 0 level, the capacitor discharges rapidly through the diode 54 which is now forward-biased, providing a low impedance discharge path to the low level. The removal of the signal from the input terminal 50 disables the directly coupled input of the AND gate 51. The rapid discharge of the capacitor 52 prevents a series of short input pulses at the input terminal 50 from building up a charge on the capacitor 52 to a voltage level sufficient to activate the gate 51. The rapid discharge of the capacitor 52 through the diode 54 also serves to return the circuit voltages quickly to the initial condition.

To compensate for the delay of the signal representing the final bit value of 1 in the character through the leading edge delay means 36, a delay means 38 is provided at the output of the OR gate 32. Both delay means insert the same delay — 10 microseconds in this example. This delay interval must be greater than the maximum permissible skew to be measured. The delay means 38 can be a simple delay line, as shown, or a leading edge delay means.

The maximum skew present in each character, as read, is measured in the following manner. The first bit of value 1 read into the character register 21 enables the OR gate 32. Subsequent bits read into the character register 21 do not affect the output of the OR gate 32. After a time interval determined by the delay of the signal through the delay means 38, 10 microseconds in this example, the output signal from the OR gate 32 appears at the output terminal of the delay means 38 and starts the timer 30.

As different ones of the flip-flops in the character register 21 become set, the output of the parity checker 34 varies according to whether, at any particular moment, the number of set flip-flops is odd or even. Ten microseconds after output of the parity checker has stabilized, that is, ten microseconds after the output signal of the parity checker has remained at a value representing 1, an output signal will appear at the output terminal of the leading edge delay means 36. The signal from the leading edge delay means 36 stops the timer. The contents of the timer 30, measured in convenient units of time, is equal to the maximum dynamic skew.

The output of the OR gate 32 is delayed by a delay means 40 to reset the flip-flops in the character register 21. The frequency at which characters are read determines the maximum delay interval of the delay means 40. The minimum delay interval of the delay means 40 must be greater than the maximum permissible dynamic skew. The output of the delay means 40 can also be used to reset the timer 30 to prepare for timing the skew in the next character.

Figure 2:
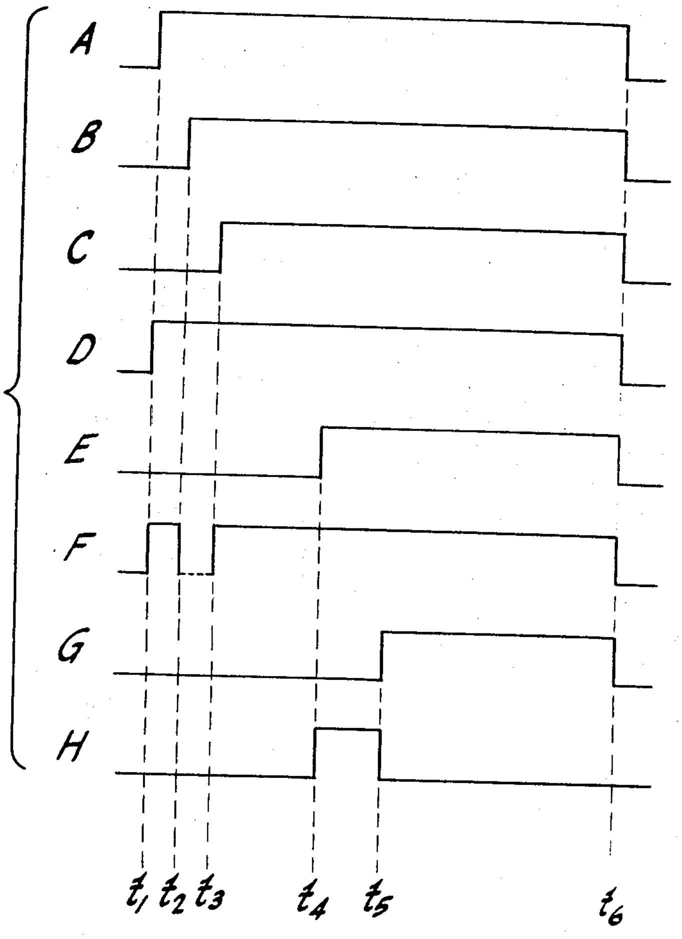
FIG. 2 is a representation of the signal waveforms as they might appear at various points on FIG. 1.

FIG. 2 is a set of illustrative waveforms as they might appear at various points in the system shown in FIG. 1. FIG. 2A shows the output signal of the flip-flop 25. At time $t_1$ the $2^0$ flip-flop, which in this example stores the bit of least significance, is set. FIG. 2D represents the output of the OR gate 32 which is activated by the setting of the flip-flop 25. Since the first bit read has correct parity, i.e., this single bit constitutes an odd number (one) of bits of value 1, the output of the parity checker 34 will appear as shown in FIG. 2F. FIG. 2B represents the output of the flip-flop 26 in the character register 21 which is set next. The output of the OR gate 32 is not changed, but the output of the parity checker 34 changes from a value representing a 0 because the presence of the two bits of value 1 indicates even parity. Therefore, as shown in FIG. 2F at time $t_2$, the output of the parity checker returns to its initial value.

Various other bits in the character will be read between the times $t_2$ and $t_3$. The output of the parity checker as shown in FIG. 2F will vary depending on whether the number of 1's present at any particular time is odd or even. At time $t_3$ the last bit having the value of 1 of the character is read and FIG. 2C represents the waveform at the output of the flip-flop 27, which, in the example, stores the last bit of value 1 which is read.

The intervals between times $t_1$ and $t_4$ and between times $t_3$ and $t_5$ in FIG. 2 are equal to the delay times, 10 microseconds in the example, inserted by the delay means 38 and 36, respectively. The output E of the delay means 38 at time $t_4$ is as shown in FIG. 2E and the output G of the leading edge delay means 36 at time $t_5$ is as shown in FIG. 2G. FIG. 2H indicates the interval during which the timer 30 is activated, that is, from time $t_4$ to time $t_5$.

As stated above, the delay intervals of the delay means 36 and 38 are the same and must equal or exceed maximum permissible dynamic skew. If the delay intervals equal or exceed the maximum dynamic skew, the output signal of the leading edge delay means 36 might occur before all the bits in a character have been read. If the maximum dynamic skew in a character exceeds the maximum permissible, the measured time interval might be incorrect. It is therefore desirable to have an indication that such a condition exists.

The delayed output signal of the OR gate 32 in FIG. 1 is used to furnish one input signal of an AND gate 50. The other input signal of the AND gate 50 is a pulse from a monostable multivibrator (one-shot) 52.

The input signal to the one-shot 52 is the undelayed output signal of the parity checker 34. The one-shot 52 produces a short pulse at its output whenever its input terminal is enabled, whether the input signal is a pulse or a level.

The output signal of the AND gate 50 sets a flip-flop 54 which supplies a signal to an appropriate control device, not shown, to indicate that an error has occurred. The flip-flop 54 is reset when the error indication has been serviced by the control device.

The pulse produced by the one-shot should be as short as possible, the lower limit being the minimum pulse duration required to set the flip-flop 54.

The circuit elements just described in FIG. 1 operate in the following manner when the dynamic skew of a character exceeds the maximum permissible.

The first bit read into the character register 21 sets the corresponding flip-flop and enables the OR gate 32. The output signal of the OR gate 32 is delayed by the delay means 38 for a period equal to or greater than the maximum permissible dynamic skew. The AND gate 50 is thus primed by the output signal of the delay means 38 after a time interval that is not less than the maximum permissible dynamic skew. If the output of the parity checker 34 is activated after this interval, a short pulse from the one-shot 52 enables the AND gate 50, setting the flip-flop 54 to indicate an error.

If the parity checker 34 produces an output pulse within a time less than the maximum permissible skew, the output pulse of the one-shot 52 has no effect on the output of the AND gate 50 and its duration is short enough that it ends before the output signal of the delay means 38 primes the other input of the AND gate 50.

The circuit shown in FIG. 1 therefore provides a means to measure the maximum dynamic skew in each character, as read. Furthermore, it provides an indication when the maximum dynamic skew of a character has exceeded the permissible limits.

The system of the invention according to FIG. 1 can be built into a device such as a tape station, and the contents of the timer 32 for successive characters may be sampled for evaluation by any one of several means. For instance, if the reading device is connected to a computer system, the output of the timer may be encoded and transmitted to the computer via a separate channel for storage in memory and later subjected to mathematical analysis for maintenance purposes.

The times shown in the circuit elements in FIG. 1 are those which may be used when the invention is built into or used with a reading device that reads at the rate of forty thousand characters per second. Such characters are read at intervals of 25 microseconds with a maximum permissible dynamic skew of 10 microseconds. A character is stored in the character register 21 for 22 microseconds. The flip-flop 54 may be set reliably with a 100 nanosecond pulse which is the duration of the output pulse from the one-shot 52. These times are intended as examples only and of course may change for use of the invention in devices with other reading rates and other circuit characteristics.

What is claimed is:

1. A circuit for measuring the skew between the first and the last arriving signals of a group of signals intended to be in time coincidence comprising, in combination:

a plurality of signal lines each for carrying one signal of said group of signals;

first circuit means coupled to all of said signal lines and receptive of all of said signals for producing an output signal in response to the first occurring one of said signals;

second circuit means coupled to all of said signal lines and receptive of all of said signals for producing a plurality of output signals during the period between the first and the last arriving signal, the last such output signal occurring in response to the last arriving of said signals;

means coupled to said second circuit means for producing an output signal only in response to said last such output signal; and means coupled to said last-named means and to said first circuit means for measuring the interval of time between said first and last arriving signals of said group of signals.

2. A circuit as set forth in claim 1 wherein said first circuit means comprises an OR gate and said second circuit means comprises a parity checker.

3. A circuit as set forth in claim 1 wherein said means for producing an output signal only in response to said last output signal comprises a circuit for producing an output pulse only in response to an input pulse of duration greater than said interval of time.

4. A circuit as set forth in claim 3 wherein said last-named means of claim 1 includes delay means coupled to said first circuit means for producing an output signal an interval of time after the receipt of the first occurring signal of said group of signals and comprises a counter responsive to said delayed output signal and to the delayed signal produced by said second output means.

5. A circuit as set forth in claim 4 further including coincidence gating means responsive to the signal from the delay means and an output signal from the second circuit means for producing an output signal indicative of skew exceeding said interval of time.

* * * * *